Patented Nov. 26, 1940

2,222,875

UNITED STATES PATENT OFFICE 2,222,875

ALKALI TREATED STARCH AND PROCESS FOR MAKING SAME

Gerald John Leuck, Evanston, Ill., assignor to Corn Products Refining Company, New York, N. Y., a corporation of New Jersey No Drawing. Application December 15, 1938, Serial No. 245,907

2 Claims. (Cl. 127—33)

This invention relates to the modification of starch and its object is to provide a novel process whereby starch may be given a high fluidity, when in paste form, without substantially increasing its solubility in cold water.

The process involves treatment of the starch with an alkali at hydrogen ion concentrations substantially above pH 7, at relatively high temperatures for relatively long periods of time and in the presence of a small amount of water. The preferred alkaline substance is ammonia but other alkaline substances may be used.

The invention is applicable to all the common starches, such as corn, potato, wheat, rice and tapioca starches.

The alkali used is preferably a volatile liquid alkali such as ammonia or an amine.

The alkalied starch of the present invention may be used for making water resistant starch products when reacted with formaldehyde in accordance with the procedures described and claimed in the copending application of Gerald John Leuck, filed December 10, 1937, Serial No. 179,122, of which the present application is a division. The alkalied starch of the present invention may, however, be used for other purposes.

Thin boiling starches are ordinarily made by heating starch in suspension in water containing a small amount of acid. Starch treated in this manner, if reacted with formaldehyde, does not give a water resistant product. It is less water-resistant than a reaction product of formaldehyde and raw starch, in fact.

It has been customary to treat starch in suspension in water with an alkali, without heating, to bring about gelatinization of the starch. If the mixture of starch, water and alkali having a pH above 7 is heated sufficiently, decomposition of the starch takes place indicated by formation of dark color and reduction in hot paste viscosity; and the starch no longer has the characteristic amylose properties. It has also been customary to treat starch-water suspensions with alkalies at hydrogen ion concentrations below pH 7, the mixture being heated as in the production of thin boiling starch. The purpose of the alkali treatment in such case is to bring about gelatinization of the starch.

The process of the present invention is different from all of the above processes and results in a characteristically different product, namely, one which may be reacted with formaldehyde to give a compound which, when set or solidified, will be adhesive, cohesive and substantially water-insoluble. According to the present process the starch is heated for a considerable period of time with a sufficient amount of alkali to maintain the pH throughout the heating period at a point substantially above the neutral point, and in the presence of a very limited amount of moisture, an amount large enough to insure the type of conversion required, that is to furnish the required hydroxyl ions but not sufficient to give a water medium for carrying the hydroxyl ions or to gelatinize the starch. The water is present, not as a liquid, but in the form of vapor or of water films, or both. In this state the hydroxyl ions are not sufficiently active to change the starch into decomposition products. The product remains essentially starch, with the usual amylose characteristics. Not being gelatinized the product is not in any sense a cold water swelling starch. That is, when put into cold water, it is not changed into a gelatinous state through adsorption of water, as is the case with so-called cold water swelling starches. The fluidity of its paste when boiled with water is increased. Its solubility is slightly but not substantially or proportionally increased. The starch has the peculiar and novel characteristic of reacting with formaldehyde to give a water resistant compound.

The presence of some water is necessary. If dry starch mixed with an alkali, added in sufficient amounts so that the mixture never becomes acidic, is roasted at ordinary dextrinizing temperatures, no reaction takes place at all comparable to the dextrinization which occurs when starch is roasted in the presence of an acid. In fact under dry conditions of operation at relatively lower temperatures no reaction takes place at all; and at extremely high temperatures the starch is decomposed but is not in any sense dextrinized. Heating dry starch mixed with an alkali in a dry atmosphere will not give a product having the characteristics sought for by the present invention.

The treatment of the starch according to the present invention involves some increase in solubility accompanying the increase in fluidity. In the dextrinization of starch the increase of fluidity is accompanied by a very large increase of solubility, the solubilities of dextrine ranging from 2% to 100% or thereabout. What is intended by the statement made herein that, in the present process, the fluidity of the starch is increased without substantial increase in solubility, is that the increase in solubility is very small in relation to the increase in fluidity, in comparison, for instance, with the increase of solubilities taking place along with increased fluidities in the dextrinization processes.

Preferably in carrying out the process of this invention the water is added to the starch little by little in order to prevent the formation of liquid medium in the material and the undesired activity of the hydroxyl ions; and the alkali is also added gradually as the treatment progresses, so as to maintain the pH during substantially the entire treatment substantially above the neutral point.

The invention will be illustrated in the following specific examples which are to be considered as merely typical and informative and not as limiting the invention to the particular operating data therein given. The intention is to claim all equivalents as well as all modifications within the scope of the appended claims.

*Example 1*

1000 parts by weight of powdered raw corn starch having a moisture content of approximately 10% is placed in a dextrine cooker of the usual type equipped with a fairly tight cover and the material is then treated with moisture and ammonia as follows: 3.5 parts of ammonia gas is injected gradually, in the course of an hour, with continuous stirring, into the cooker, so that the starch is thereby made definitely alkaline. Heat is then applied so that the temperature of the starch is gradually raised to a maximum of approximately 300° F. in the course of eight hours, and the starch is maintained at approximately this temperature for an additional fifteen hours. After the temperature of the starch has passed 212° F., the boiling point of water, additional ammonia, and water in the form of steam, are injected into the cooker, at such a rate as to maintain an excess of each of these constituents in the atmosphere, within the cooker. This condition of excess moisture is satisfied, for example, when the moisture continues to condense on the inside of the cooker lid. Continued evolution of steam with a strong odor of ammonia, passing through a small vent provided in the cooker lid, is evidence that the condition of excess of both of these constituents is being maintained. Stirring is continued throughout the heating period.

Subsequent to the first addition of ammonia the starch should always test purple to the pH indicator meta cresol purple, as an indication of alkalinity which in this case will be about pH 8.5 or higher. This test also serves as an indication that a sufficient concentration of ammonia is being maintained. No moisture except that originally present in the starch and no ammonia except the 3.5 parts originally introduced need be added until after the temperature has passed the boiling point of water. Thereafter, the addition of one-quarter part of ammonia per hour and the addition of steam at a rate above indicated will ordinarily suffice if the cooker is fairly tight to maintain moisture and ammonia at high enough concentrations. After the heat treatment is finished the charge is brought to room temperature in a cooler and sieved in a reel according to ordinary dextrine manufacturing practice. The product obtained is a powder of a light, yellow-brown color. Its fluidity, when in the form of a paste, will be much higher than the fluidity of the raw starch treated. The cold water solubility will not be increased in proportion.

*Example 2*

100 parts of powdered raw corn starch having an ordinary air dry moisture content of 10%–15% is placed in a horizontal cylinder which is closed except for a gas aperture at each end. Ammonia gas at the rate of 1 part per hour is bubbled through water, held at a temperature near its boiling point, and the gas thus moistened is continuously passed through the cylinder, which is continuously revolved as a means of mixing the ingredients. As soon as there is an odor of ammonia at the exit aperture heat is applied to the cylinder at such a rate that the starch reaches a temperature of approximately 284° F. in 2 to 3 hours. The treatment is then continued at this maximum temperature with the addition of moistened ammonia gas for sixteen hours longer. The product obtained upon cooling is similar in appearance and properties to the product of the dextrine cooker described in Example 1.

*Example 3*

1500 parts of powdered raw corn starch from which the free or absorbed moisture has previously been substantially removed by drying to a constant weight at 212° F. is mixed thoroughly with 75 parts of 28% aqueous ammonia and is then introduced into an autoclave. The temperature within the autoclave is gradually increased at such a rate that in two hours the charge reaches a maximum temperature of approximately 275° F. and a maximum gauge pressure of approximately 50 pounds per square inch. The charge is maintained at approximately this temperature and pressure for seven hours and is then allowed to cool.

*Example 4*

1000 parts of powdered raw corn starch having a moisture content of approximately 5% is placed in the dextrine cooker described in Example 1. The subsequent procedure of alkaline treatment is the same as that described in Example 1 except that time and temperature conditions are different in the following respects: After the beginning of the application of heat, the temperature of the starch is gradually raised to 335° F. in the course of nine hours and is thereafter maintained at approximately this temperature for an additional five hours (instead of as in Example 1, attaining a maximum temperature of 300° F. in the course of eight hours) and is thereafter maintained at this temperature for fifteen hours.

*Example 5*

100 parts of powdered air dry potato starch is thoroughly mixed with 10 parts of 28% aqueous ammonia and the mixture is placed in an autoclave. The material is gradually raised to a temperature of 250° F. and maintained at this temperature for sixteen hours before cooling.

*Example 6*

The procedure here is the same as in Example 4 except that the time and temperature conditions during the alkaline treatment are different in the following respects: After the beginning of application of heat, the temperature of the starch is gradually raised to 335° F. in the course of seven hours and is thereafter maintained at approximately this temperature for an additional seven hours. This procedure yields a product of greater fluidity than the product of Example 4.

When reference is made to "parts," it is understood that parts by weight is intended.

In all of the examples given above, the alkali treatment provides a means for modifying the starch so that its fluidity is increased without substantial increase of cold water solubility. A raw corn starch possessing a 1/25 (one part of the starch heated pasted in 25 parts of water) relative fluidity of 4 cc. (volume of paste flowing through a standard aperture in a standard period of time) and a 0.2% content of cold water solubles, has been found, upon subjection to the alkali treatment of the hereinabove described Example 1, to attain a 1/15 relative fluidity of 2.2 cc., which means a considerably higher fluidity than the raw starch, and a cold water solubles content of only 1.9%. According to this 1/15 method of testing for fluidity the above mentioned raw starch would have zero fluidity. Upon subjecting raw corn starch of the character above mentioned to the alkali treatment described in Example 4, the product has been found to have a 1/15 relative fluidity of 30 cc. and a solubles content of 1.3%. Upon subjection of a like raw starch to the alkali treatment described in Example 6, the product has been found to have a 1/12 relative fluidity of 75, while the cold water solubles content has risen to only 3.7%. Thus, in accordance with the present invention, the fluidity of the starch may be very greatly increased without substantial increase in its cold water solubility as above defined.

I claim:

1. Process of treating starch to increase its fluidity without substantial increase of its cold water solubility which comprises: heating the starch to a temperature of approximately 335° F. for a period of 14 to 24 hours in the presence of steam in an amount insufficient to gelatinize the starch but sufficient to provide hydroxyl ions and ammonia in amount to keep the material at a pH above 7.

2. An alkali treated starch product characterized in that: it is ungelatinized; it contains substantially no amylose decomposition products; it has a higher fluidity than raw starch and a cold water solubility which is not substantially higher than that of raw starch; and it reacts with formaldehyde at a pH not substantially above 2 to form a water resistance compound.

GERALD JOHN LEUCK.